C. V. RAPER.
SYSTEM OF AND APPARATUS FOR THE CONTROL OF ELECTRIC MOTORS.
APPLICATION FILED MAR. 17, 1911.
1,175,295.
Patented Mar. 14, 1916.
7 SHEETS—SHEET 1.
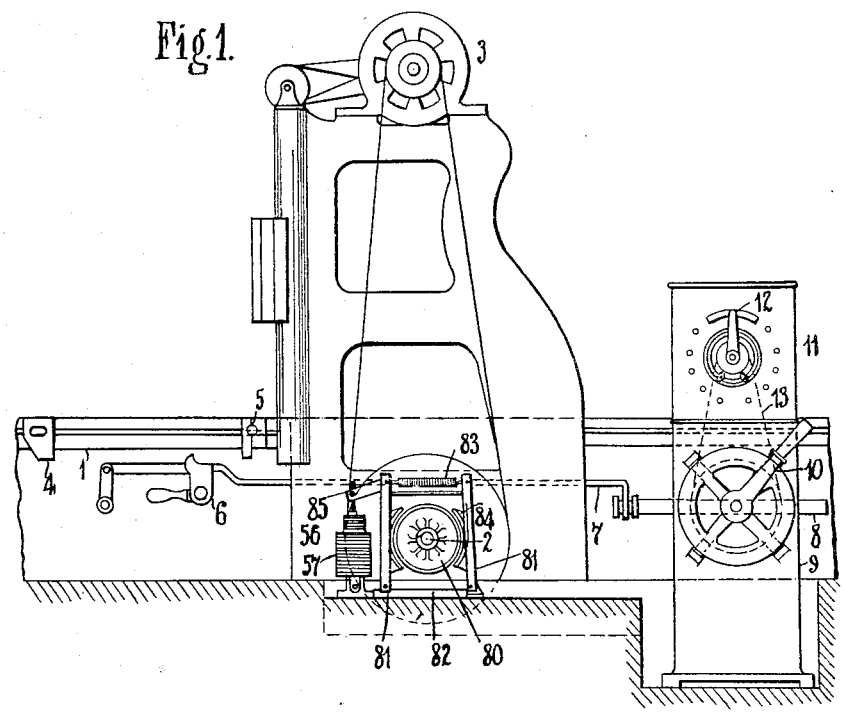
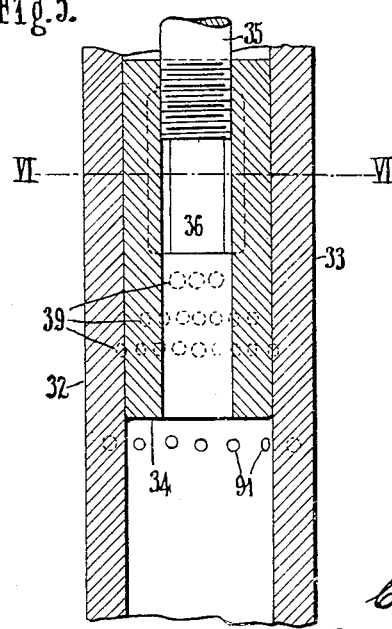
WITNESSES:
INVENTOR:

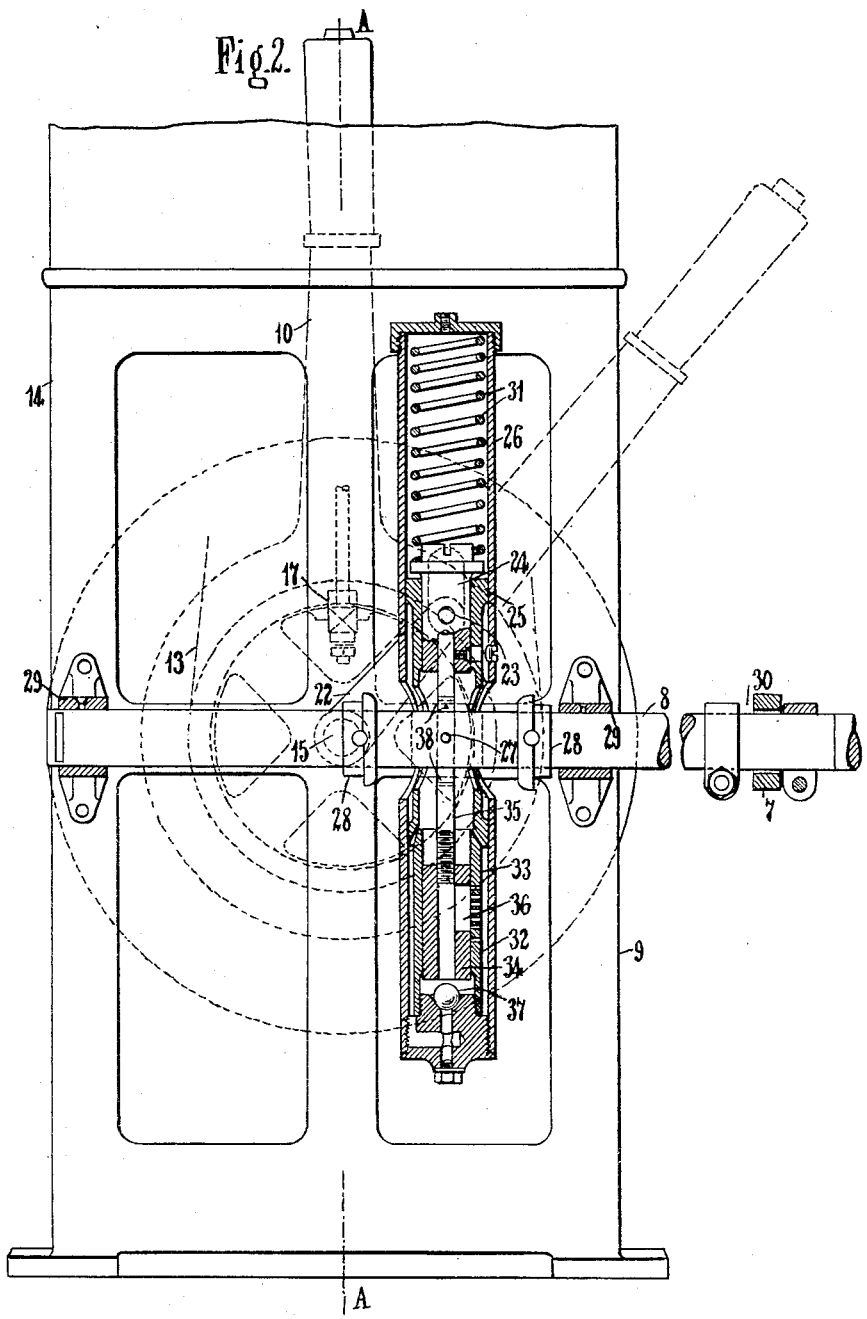

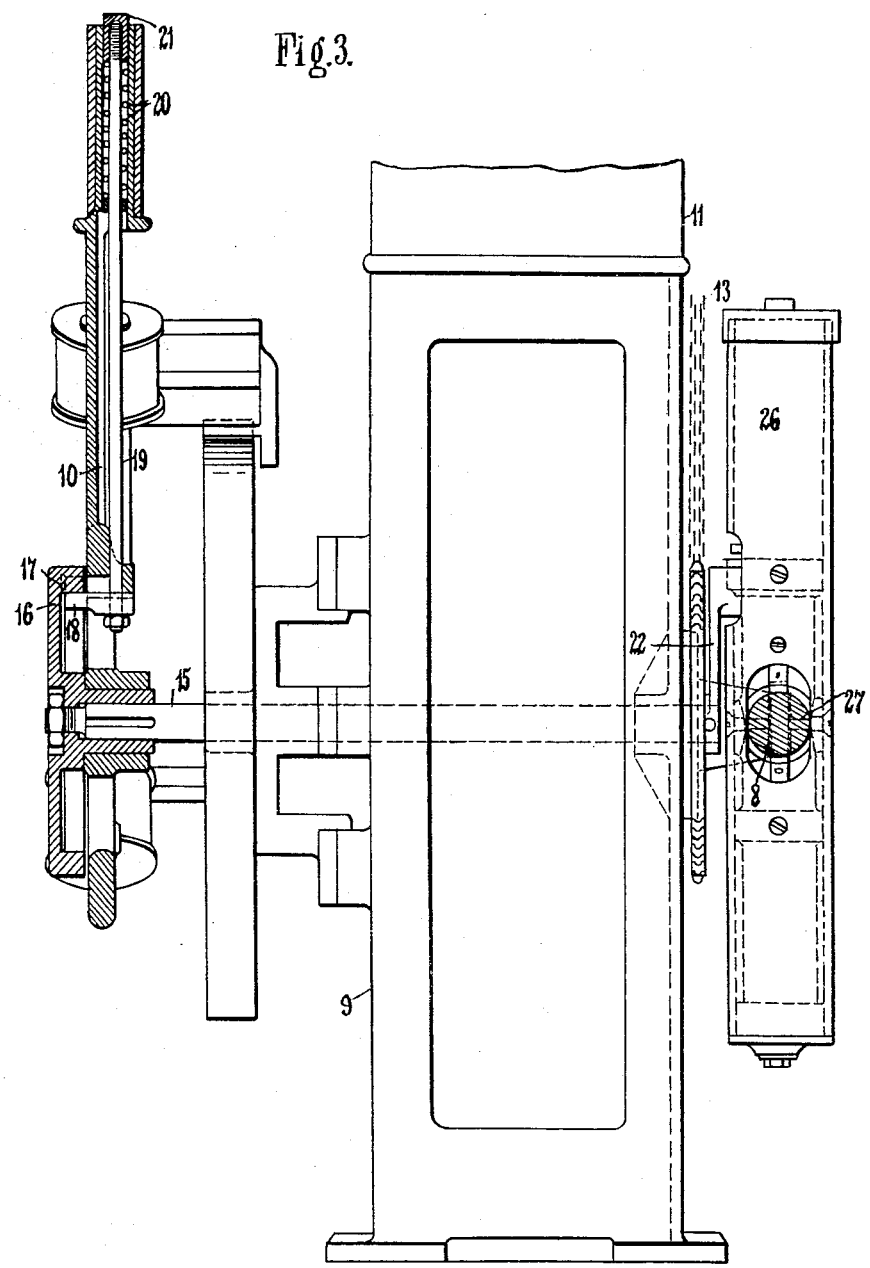

C. V. RAPER.
SYSTEM OF AND APPARATUS FOR THE CONTROL OF ELECTRIC MOTORS.
APPLICATION FILED MAR. 17, 1911.

1,175,295.

Patented Mar. 14, 1916.
7 SHEETS—SHEET 4.

WITNESSES:
B. B. Hines
M. C. Merz

INVENTOR:
Charles V. Raper
By Wesley G. Carr
Attorney

C. V. RAPER.
SYSTEM OF AND APPARATUS FOR THE CONTROL OF ELECTRIC MOTORS.
APPLICATION FILED MAR. 17, 1911.

1,175,295.

Patented Mar. 14, 1916.
7 SHEETS—SHEET 5.

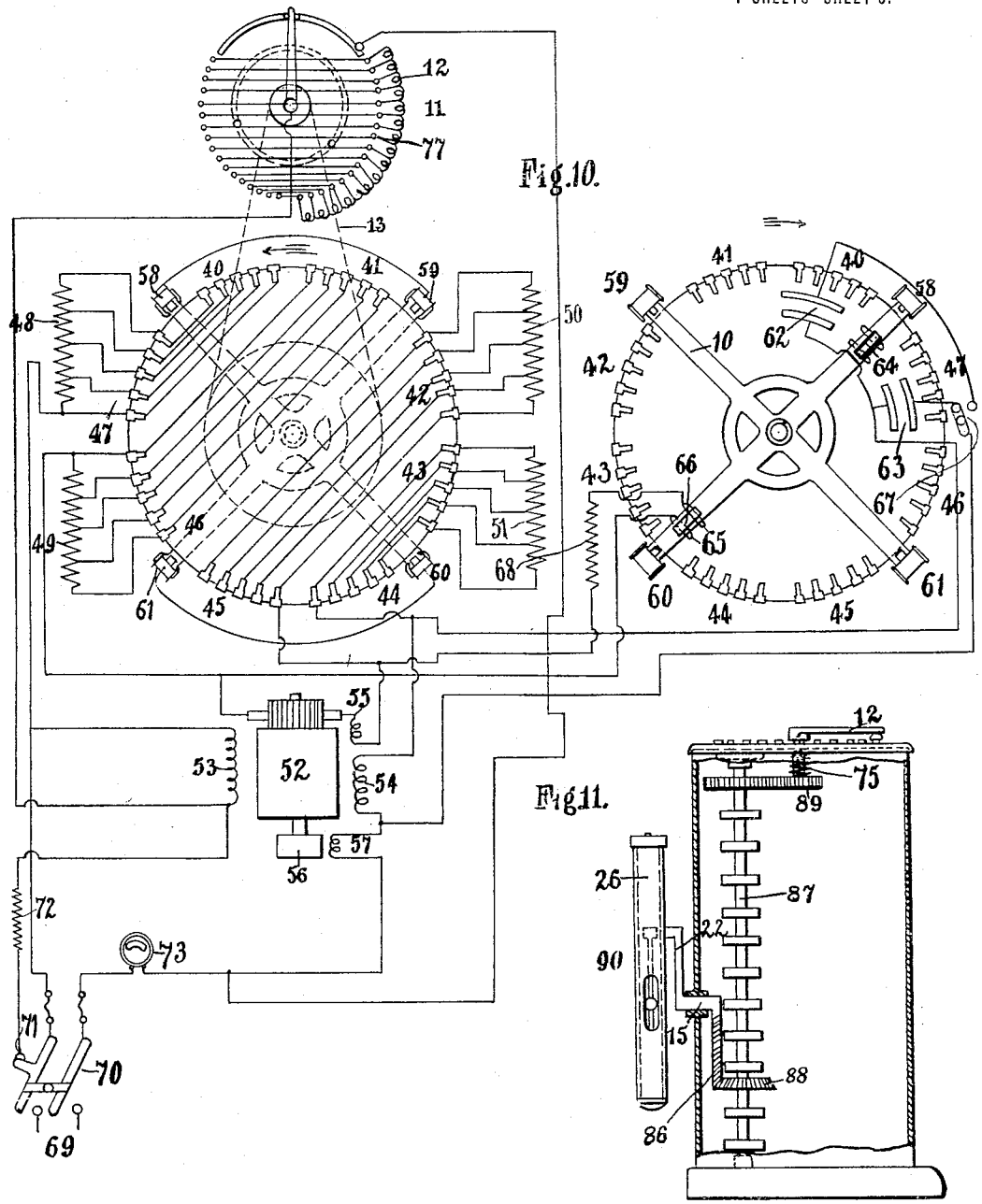

C. V. RAPER.
SYSTEM OF AND APPARATUS FOR THE CONTROL OF ELECTRIC MOTORS.
APPLICATION FILED MAR. 17, 1911.
1,175,295.
Patented Mar. 14, 1916.
7 SHEETS—SHEET 7.
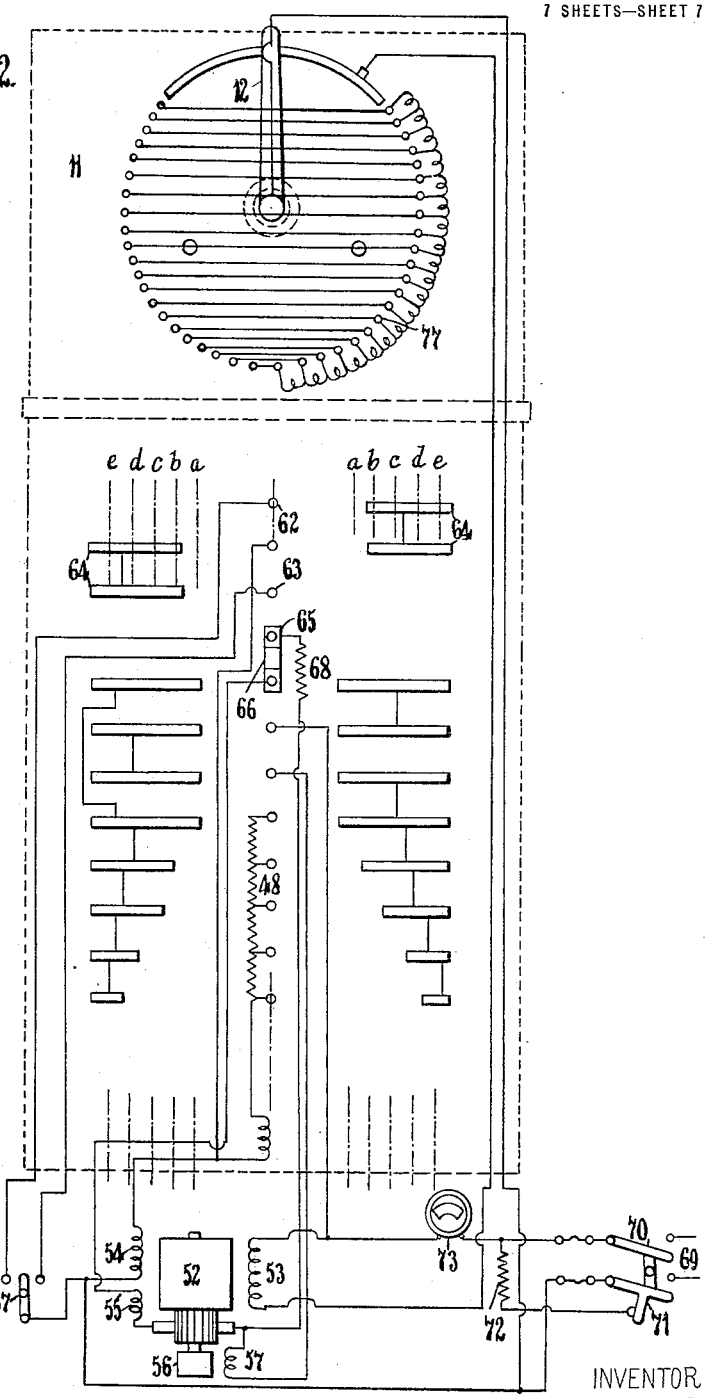

UNITED STATES PATENT OFFICE.

CHARLES VINCENT RAPER, OF BAVAY, FRANCE, ASSIGNOR TO WESTINGHOUSE ELECTRIC AND MANUFACTURING COMPANY, A CORPORATION OF PENNSYLVANIA.

SYSTEM OF AND APPARATUS FOR THE CONTROL OF ELECTRIC MOTORS.

1,175,295.   Specification of Letters Patent.   Patented Mar. 14, 1916.

Application filed March 17, 1911. Serial No. 615,089.

*To all whom it may concern:*

Be it known that I, CHARLES VINCENT RAPER, a subject of the King of England, and a resident of Bavay, Nord, France, have invented a new and useful Improvement in Systems of and Apparatus for the Control of Electric Motors, of which the following is a specification.

This invention relates to systems of and apparatus for the control of electric motors, particularly those employed for driving planing machines or the like, in which the direction of rotation of the motor is required to be automatically reversed after a certain predetermined travel of the moving member of the machine has been accomplished. The controller for such motors usually comprises stationary contacts successively engaged by brushes carried on a rotating arm adapted to be rocked through a considerable angle, and it is usual to provide the moving member of the machine with a pin or projection adapted to engage with the mechanism of the motor controller when the said member has nearly completed its stroke or travel in either direction for the purpose of reversing the direction of rotation of the motor.

The present invention has for its object to provide an improved actuating mechanism for the controlling apparatus and also improved systems of control for the motors and brakes, and, in order that the nature of the same may be clearly understood, it will now be described with reference to the figures of the accompanying drawings which show several forms in which the invention may be carried into practice.

Figure 4:
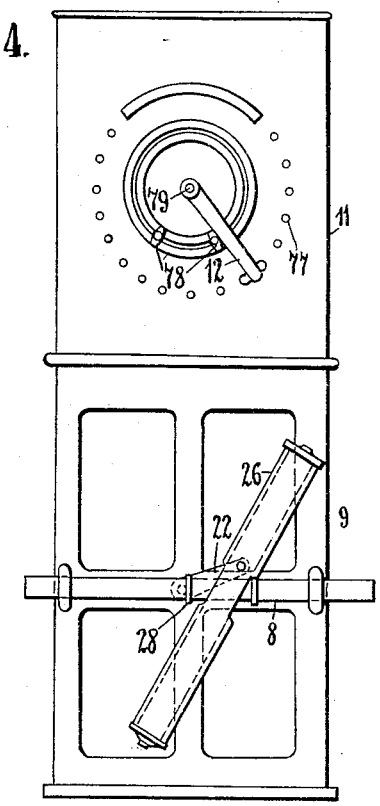
Figure 7:
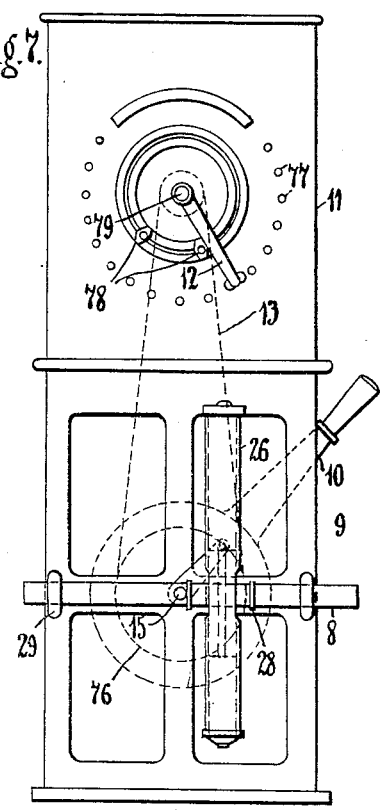
Figure 6:
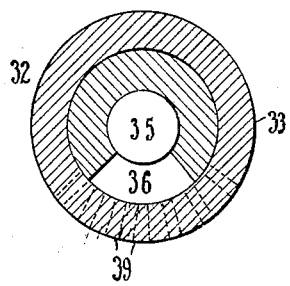
Figure 9:
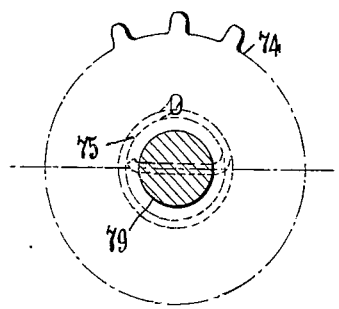
Figure 8:
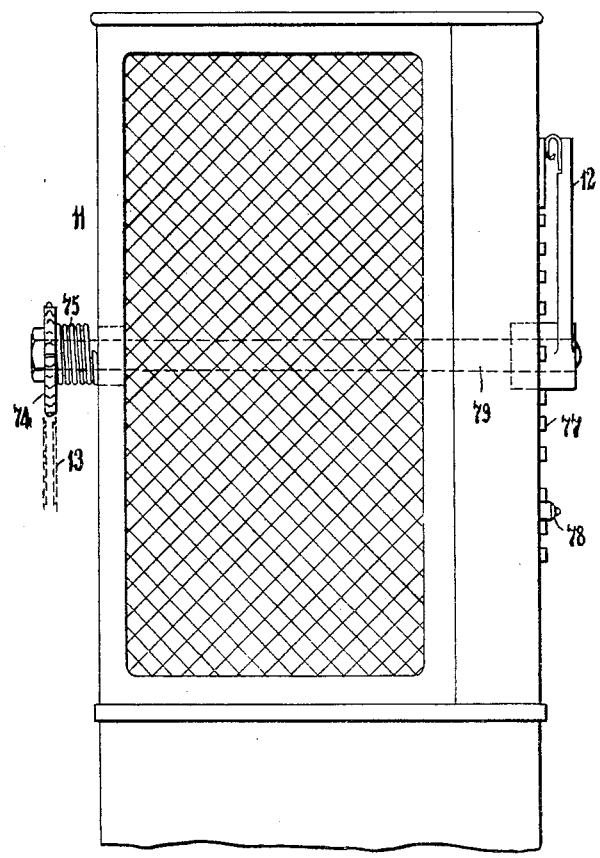

Figure 1 is a view, in side elevation, of a planing machine driven by an electric motor provided with a controller having automatic actuating mechanism constructed in accordance with the invention. Fig. 2 is a view in front elevation, partly sectional, showing, on an enlarged scale, the actuating mechanism of the controller. Fig. 3 is a sectional elevation of the apparatus shown in Fig. 2. Fig. 4 is a view similar to Fig. 2, but on a smaller scale, and illustrating the positions of the principal elements of the actuating mechanism at a certain stage of its operation. Figs. 5 and 6 are detail views, partly sectional, illustrating the construction of a portion of the apparatus shown in the preceding figures, Fig. 6 being a sectional view on the line VI—VI of Fig. 5. Figs. 7 and 8 are views in front and side elevation of the controller of the apparatus showing more clearly the arrangement of a particular portion thereof, Fig. 9 being a view showing further details. Fig. 10 is a diagram showing the circuit connections of the motor and controller of the preceding figures to the supply circuit. Fig. 11 is a view illustrating an application of the invention to an electric controller of a different type from that shown in the preceding figures, and Fig. 12 is a diagram similar to Fig. 10 but illustrating a preferred system of connections for the controller shown in Fig. 11.

Referring now to Fig. 1, a moving table or member of a planing machine is indicated at 1 and is arranged to be given a reciprocating horizontal motion by means of gearing operated from a shaft 2 driven by means of an electric motor 3. The table 1 is provided with adjustable projections or "dogs" 4, 5 adapted to engage the end of a lever 6 when the table has nearly reached the limits of its travel to the right and left, respectively. The lever 6 is pivoted to the stationary frame of the planing machine, and is connected, by means of a rod 7, to a bar 8 mounted on the frame of the motor controller 9, the said bar serving to effect the movement of the controller arm 10 to reverse the direction of rotation of the motor, in a manner which will be hereinafter described. The motor controller 9 also comprises a shunt field rheostat 11, the rheostat arm 12 of which is operated by means of a chain 13 and chain wheels mounted on the shafts of the rheostat arm 12 and the controller arm 10, respectively, or by means of other suitable connecting mechanism.

Referring now to Figs. 2 and 3, the motor controller 9 comprises a frame or casing 14 in which the controlling resistances are preferably located and is provided with a shaft 15 mounted in bearings on the frame 14 and carrying the controller arm 10 loosely mounted thereon. The shaft 15 is provided with a flanged disk 16 having a notch or recess 17 at one point on its inner periphery with which engages a pin or projection 18 attached to a rod 19 that is adapted to move in guides on the controller handle 10, the projection 18 being maintained in engagement with notch 17 by means of a spring 20, as will be readily understood from a consideration of Fig. 3. The upper end of the rod 19 is provided with a button 21 of insulating material that projects beyond the end of the controller handle in order that the rod 19 and its projection 18 may be pressed inwardly against the action of the spring 20 to release the controller handle 10 from the shaft 15 when desired. The controller arm 10 is provided with brushes to successively engage fixed contacts as the controller arm is rocked from its middle or "off" position, indicated at A—A, through its arc of movement in either direction of rotation. The construction and arrangement of the controller arm and its coöperating contacts may be of any well known type and need not be further described.

The controller shaft 15, at the end opposite to that carrying the flanged disk 16, is provided with a crank 22, the outer end of which is pivoted at 23 to a piston or block 24 that is adapted to move in a cylindrical guide 25 mounted in a tubular casing 26. The casing 26 is pivotally mounted at 27 upon the bar 8 which is provided with collars 28 so disposed as to suitably limit the angular movement of the casing 26 on its pivots 27. The bar 8 is supported in guides 29 on the controller frame and is arranged to be moved axially parallel to the plane of movement of the crank 22 by means of the projections 4 and 5 on the moving table of the planing machine and the rod 7 as shown in Fig. 1, the rods 7 and 8 being so connected by the device 30 that a definite amount of lost motion between them can take place, which amount can be varied as desired.

The movement of the piston 24 in its cylindrical guide 25 outwardly from the pivots 27 is opposed by means of a spring 31 that is interposed between the piston 24 and the upper cap of the tubular casing 26. A further control of the movement of the piston 24 relative to the guide 25 is effected by means of a dash-pot 32 which is located in the lower part of the tubular casing 26 and comprises a cylinder 33 and a piston 34 having a connection to the piston 24 by means of a rod 35. The piston 34 comprises a hollow tube that is closed at its upper end by means of the rod 35 and has a lateral opening 36 to register with holes in the cylinder 33, this part of the apparatus being shown on a larger scale in Figs. 5 and 6. A downward movement of the piston 34 of the dash-pot causes the oil to flow from the interior of the tubular piston through the opening 36 and the holes in the walls of the cylinder 33 to the exterior of the said cylinder, the lower part of the tubular casing 26 being filled with oil and a check valve 37 being provided to permit oil to flow from the casing 26 into the interior of the piston 34. Holes 38 in the piston rod 35 are provided for the insertion of a suitable tool whereby said rod with its attached piston 34 may be rotated in order to determine the number of holes in the cylinder 33 which shall register with the opening 36 and thereby increase or decrease the number of passages available for the flow of oil through the dash-pot.

Referring now to Figs. 5 and 6, the holes in the wall of the cylinder 33 are preferably divided into two groups 39 and 91 so that when the piston 34 is at the top of its stroke, as shown at Fig. 5, the lower group of holes 91 is uncovered by the lower edge of the piston 34 and oil can therefore flow through these holes to permit the descent of the piston 34 at a corresponding speed. The group of holes 39 is divided into a plurality of rows, the first of these being arranged to be uncovered by the opening 36 as soon as the group of holes 91 has been closed by the initial movement of the piston 34 when descending, successive rows of the holes 39 being uncovered to the opening 36 during the descent of the piston. It will be evident that the control of the speed of the movement of the piston 24 during its range of travel relative to its guide 25 can be varied in any desired manner by varying the arrangement and location of the holes 39 and 91 in the cylinder 33 of the dash-pot.

The operation of the apparatus is as follows:—The reciprocating member or table 1 of the planing machine is assumed to be approaching one of its extreme positions, the projection 4 thereon being in engagement with the lever 6 to actuate the reciprocating bars 7 and 8 to the right (Fig. 1). The tubular casing 26 with the crank 22 connected thereto will then be in the position shown in Fig. 2 of the drawings, the piston 24 being at that end of its cylindrical guide 25 which is nearest to the pivots 27. At this stage of operation, the controller handle 10 will be in the position indicated in dotted lines at the right in Fig. 2, having been moved thereto by the shaft 15 acting through the flanged disk 16 and the coöperating projection 18. The first part of the movement of the bar 8 to the left (Fig. 2) causes the casing 26 to turn about the pivots 27 until the said casing comes into engagement with one or both of the collars 28 on the bar 8, the position of the casing 26 being as shown in Fig. 4 at this stage of the operation. A further movement of the bar 8 will cause the casing 26 with its piston 24 and the crank 22 connected thereto to move toward the left and, owing to the fact that the pivots 27 of the casing 26 are moving in a straight line while the pivot 23 of the piston 24 is moving in a circle, the piston 24 will necessarily be moved upward in its cylindrical guide 25 in an outward direction from the pivots 27 against the force of the spring 31. The movement of the crank 22 is transmitted through the shaft 15 and the flanged disk 16 to the controller arm 10 and accordingly moves it toward its "off" position indicated by the dotted line A—A. The compression of the spring 31 by the motion of the piston 24 gradually increases and, as soon as the pivot 23 has passed the axis of the controller shaft 15, the force of the spring 31 has an effective moment about the axis of the shaft 15 and therefore moves the crank 22 and thereby the controller arm 10 with increasing velocity away from the off position of the latter independently of the movement of the reciprocating bar 8, movement of which ceases on the controller arm 10 reaching the "off" position indicated at "A", the speed of movement of the controller arm 10 being controlled by the variable retardation effected by the dash-pot 33, as will be hereinafter explained. The force of the spring 31 causes the bar 8 and the controller shaft 15 with the arm 10 to be carried fully over to their extreme left-hand positions, respectively, in which positions the motor is finally and fully connected for the reverse direction of rotation. The direction of movement of the moving member 1 of the planing machine is therefore reversed until the lever 6 is again engaged by the projection 4 of the said moving member when the latter is near the end of its reverse stroke and causes the controller arm 10 to return to its former position, in a manner similar to that already described for the forward stroke.

It will be observed that the final movement of the controller arm 10 to its off position takes place when the piston 24 is in its extreme outer position in its guide 25, that is to say, when the piston 34 of the dash-pot is at the corresponding end of the cylinder 33. The opening 36 in the piston 34 and the holes 39, 91 in the cylinder 33 of the dash-pot above described are so arranged that, in this position, the minimum resistance is offered to the flow of oil. During the other part of the movement of the controller arm 10, that is to say, when approaching either of its extreme positions to the right or to the left, the movement of the dash-pot piston 34 is more or less impeded, according to the number of holes exposed by the piston 34, by which means the controller arm 10 is retarded during this part of the movement. The rheostat for the shunt field of the motor is mounted on the top of the controller 9, as shown in Fig. 1, and on a larger scale in Figs. 7 and 8. The rheostat 11 comprises a casing within which the field-controlling resistances are mounted and has a shaft 79 carrying the arm 12 of the rheostat, the opposite end of the shaft 79 being provided with a chain wheel 74 loosely mounted on the said shaft and connected thereto by means of a spring 75, as will be readily understood from a consideration of Figs. 8 and 9, the chain wheel 74 being connected, by means of a chain 13 to another chain wheel 76 mounted on the shaft 15 of the main controller. The rheostat 11 also comprises a number of contact terminals 77 mounted on a faceplate of insulating material and connected to suitable points in the rheostat resistor, the faceplate being also provided with two adjustable stops 78 which can be moved into any desired position to limit the arc of movement of the rheostat arm 12 and thereby determine the maximum speed of rotation of the motor in either direction. The chain wheels 74 and 76 are so selected that the shaft 79 is geared up in the ratio of about 5 to 1 relative to the shaft 15, so that the arc of movement of the controller shaft 15, which is about 36° will correspond to an arc of movement of the shaft 79 of about 180°. It will be understood that the movement of the arm 12 is limited by the stops 78 so that any further movement of the controller shaft 15 is taken up by the spring 75.

Referring now to Fig. 10, the controller contact segments are mounted on a drum of insulating material and are arranged in eight groups, 40, 41, 42, 43, 44, 45, 46, 47, the individual contact segments of which are connected to the contact segments of another group as shown. The controlling resistors hereinbefore referred to as preferably located in the controller casing are indicated at 48, 49, 50 and 51, and the motor is indicated as comprising an armature 52 and shunt, series and compensating field windings 53, 54 and 55, respectively. The motor is also provided with mechanical spring-applied brake mechanism, indicated at 56 in Figs. 1 and 10, which is arranged to be electromagnetically released by means of an electro-magnet 57, four contact members 58, 59, 60 and 61 forming the movable contact members of the controller, the contact members 58 and 60 being connected to the contact members 59 and 61, respectively. The reverse side of the controller drum, indicated at the right-hand of Fig. 10, is provided with pairs of fixed contact pieces 62 and 63 that are adapted to be bridged by an insulated contact member 64 of the controller arm 10 when the latter is nearing its extreme positions in the one or the other direction. A pair of fixed contact pieces 65 are also carried on this side of the controller drum and are adapted to be bridged by an insulated contact member 66 of the controller arm 10 when the latter is in its "off" position, the contact member 66 serving to connect a resistor 68 across the armature brushes for the purpose of acting as a dynamic brake. When the contact pieces 62 and 63 are bridged by the contact member 64, they serve, respectively, according to the position of a switch 67, to short-circuit the series winding 54 of the motor when rotating in the one or the other direction, according to the position of the controller arm 10. The switch 67 is automatically thrown by any well known and suitable means, thus enabling the speed of the motor for either direction of rotation, as desired, to be controlled by the shunt rheostat alone. The supply circuit terminals are indicated at 69 and a main switch 70 is provided for entirely disconnecting the motor from the suppply circuit when desired, the switch 70 also having a pair of contact terminals 71 which, when the switch is opened, serve to connect the discharge resistor 72 across the shunt field winding 53 to prevent injurious arcing when the circuit of the winding 53 is broken.

In Fig. 10, the controller arm is shown as being in its off position and is moved therefrom in the one or the other direction to bring the contact members 58, 59, 60 and 61 into engagement with the fixed groups of contact segments by the mechanism already described. The various connections effected by the controller shown in Fig. 10 are substantially those well known in the art and need only be briefly referred to. When the controller arm 10 and its attached contact members 58 to 61 are rotated in the direction indicated by the arrow to bring the said contact members into engagement with the corresponding groups of fixed contact segments, the circuit is completed from one of the supply circuit terminals 69, through the resistor 48, contact member 58, contact member 59, resistor 49, the armature 52 of the motor, compensating winding 55, resistor 50, contact member 61, contact member 60, resistor 51, series field winding 54, brake electromagnet 57 and ammeter 73, back to the other terminal of the supply circuit 69. A parallel circuit to the one just described is through the shunt field winding 53 and through the shunt field rheostat 11, the amount of resistance included by the rheostat 11 in the shunt field circuit being decreased as the controller arm 10 is moved. Owing to the shape of the first contact terminal of the rheostat 11, however, the shunt field is maintained at its full value until a considerable movement of the controller arm 10 has taken place. The armature of the motor therefore rotates in a corresponding direction and, as the controller arm 10 is moved farther from its off position, the number of active sections of the resistors 48 to 51 is decreased until all the resistor sections are finally cut out of circuit when the contact members 58, 59, 60 and 61 are in engagement with the last stationary contact segments of the corresponding sets, as will be readily understood from a consideration of Fig. 10. As soon as the controller arm has nearly reached its extreme position in the one or the other direction, the bridge member 64 comes into engagement with either the contact pieces 62 or the contact pieces 63 and, according to the position of the switch 67, the series field winding 54 is short circuited for the one or the other direction of rotation of the motor, thereby allowing the control of the motor speed to be effected entirely by the shunt field rheostat 11, the position of which is controlled by the stops 78, as previously described with reference to Fig. 7. When the controller arm 10 is returned to its off position, the fixed contact pieces 65 are bridged by the contact member 66 of the controller arm and the resistor 68 is thereby connected across the armature brushes of the motor, thus serving as a powerful dynamic brake to rapidly bring the motor to a standstill before its direction of rotation is reversed by a movement of the controller arm 10 in the opposite direction.

Operation of the controller arm from the off position indicated in Fig. 10 in the opposite direction to that indicated by the arrow will reverse the direction of current through the armature 52 and the compensating winding 55 of the motor. When the controller arm 10 and its attached contact members 58, 59, 60 and 61 are thus rotated to bring the said contact members into engagement with the corresponding groups of fixed contact segments, the circuit will be completed from one of the supply circuit terminals 69 through the resistor 48, contact member 58, contact member 59, resistor 50, compensating winding 55, armature 52 of the motor, resistor 49, contact member 61, contact member 60, resistor 51, series field winding 54, brake electromagnet 57 and ammeter 73, back to the other terminal 69 of the supply circuit.

Referring now to Fig. 11, the invention is illustrated as applied to a controller of the so-called tramway type in which the shaft carrying the contact segments of the controller is usually vertical. In the construction illustrated in this figure, the controller shaft 87 is provided with a beveled gear wheel 88 intermeshing with a second beveled gear 86 attached to the controller shaft 15 carrying the crank 22; the shaft of this figure corresponding to the shaft 15 of Figs. 2 and 3 and being mounted in bearings in the controller casing. The automatic actuating device for the controller is similar to that already described with reference to Figs. 2 and 3 and is indicated diagrammatically at 90. The shunt field rheostat is preferably mounted on the top of the controller casing, its arm 12 being driven by gear wheels 89 as shown in Fig. 11, the gear ratio being so chosen as to produce a large movement of the rheostat arm 12 relative to the movement of the controller shaft 87, as described with reference to the previous figures.

Referring now to Fig. 12, a preferred system of connections for the controller of Fig. 11 is illustrated diagrammatically, the various connections being similar to those already described with reference to Fig. 10, and the same numerals being used to indicate the various parts of the motor, brake, sub-divided field rheostat, etc. The controller shaft carrying the various contacts is adapted to be moved from the off position in which it is shown in the figure by the automatic actuating mechanism to any one of the positions indicated by the dotted lines, $a$, $b$, $c$, $d$, $e$, in the one or the other direction. The operation of the apparatus is very similar to that already described with reference to Fig. 10 and the various connections for the different controller positions are evident without further reference thereto.

The mechanical arrangements of the brake mechanism for retarding the movement of the moving member of the planing machine when it is approaching the end of its stroke are shown in Fig. 1 wherein 80 indicates the brake pulley on the shaft 2 of the planing machine, which pulley is provided with a brake 56 comprising a pair of levers 81 pivoted at their lower ends on a bedplate 82, the upper ends of the levers being connected by means of a spring 83. The levers 81 carry brake blocks 84 adapted to be drawn into engagement with the brake wheel 80 by means of the spring 83. The electro-magnetically actuated releasing mechanism referred to in connection with Figs. 10 and 12 comprises a lever 85 adapted, when drawn downward by the electro-magnet 57, to oppose the action of the spring 83 and release the brake.

It will be understood that the construction and details as described above may be considerably varied without exceeding the scope of the invention.

I claim as my invention:

1. The combination with an electric motor and a reciprocating load, of a motor controller adapted to be operated by said load, a resilient connection between the controller and the load, and means for automatically regulating the speed of operation of the controller independently of the speed of movement of the load during certain stages of its operation.

2. The combination with an electric motor, a reciprocating load, and a controller adapted to be operated by said load, of a tubular piston, a spring in said piston for receiving power from said load during the first part of its movement and serving to impart the stored power to the controller during a later stage of the movement of said load and thus move it independently of the movement of the load.

3. The combination with an electric motor, a reciprocating load and a controller adapted to be operated by said load, of a tubular casing operatively connected to said reciprocating load, and a spring-controlled piston in said casing having a crank arm connection to the movable member of the controller.

4. The combination with a reciprocating member and an electric motor controller having a movable member adapted to be operated thereby, of a tubular casing pivoted upon said reciprocating member, a spring-controlled piston located in said casing and having a crank arm connection to the movable member of the controller, and a dash-pot adapted to offer a variable resistance to the operation of said piston.

5. The combination with a reciprocating member and an electric motor controller having a movable member adapted to be operated thereby, of a tubular casing pivoted upon said reciprocating member, a spring-controlled piston located in said casing and having a crank-arm connection to the movable member of the controller, a tubular piston closed at its upper end, a rod attaching said tubular piston to said spring-controlled piston, a cylinder located in the lower part of the tubular casing to receive said tubular piston and having orifices adapted to be successively uncovered by said tubular piston and to communicate with an opening therein as said piston is moved.

6. The combination with a reciprocating member and an electric motor controller adapted to be operated thereby and having a shaft, a crank arm mounted on the shaft, a piston connected to said crank, a tubular casing for said piston pivotally mounted upon said member, a dash pot, and a connection between the same and said piston.

7. The combination with an electric motor provided with a shunt field winding and a series field winding and adapted to drive a reciprocating load, of a controller comprising operatively connected armature and shunt field rheostats and means for short-circuiting the series field winding as the controller approaches the one or the other of its extreme positions corresponding to the forward and reverse directions of rotation of the motor.

8. The combination with an electric motor provided with a shunt field winding and a series field winding and adapted to drive a reciprocating load, of a controller comprising operatively connected armature and shunt field rheostats, means for short-circuiting the series field winding when the controller approaches the one or the other of its extreme positions corresponding to the forward and reverse directions of rotation of the motor, and means for connecting a resistor across the commutator brushes of the motor when the controller is in its "off" position.

9. The combination with an electric motor provided with a shunt field winding and a series field winding and a reciprocating load driven by said motor, of a controller, means for short-circuiting the series field winding as the controller approaches the one or the other of its extreme positions corresponding to the forward and reverse directions of rotation of the motor, a resistor in circuit with the shunt field winding, a device for controlling said resistor and a resilient coupling between the motor controller and said device.

In testimony whereof I have hereunto subscribed my name this second day of March, 1911.

CHARLES VINCENT RAPER.

Witnesses:
 PERCY PAYNE WOODHAUS,
 ALFRED MOVEDER.

Copies of this patent may be obtained for five cents each, by addressing the "Commissioner of Patents, Washington, D. C."